(12) United States Patent
Berard

(10) Patent No.: US 8,396,854 B2
(45) Date of Patent: Mar. 12, 2013

(54) DIGITAL DOCUMENT MANAGEMENT SYSTEM

(75) Inventor: Jean-Jacques Berard, Villeurbanne (FR)

(73) Assignee: Esker, Inc., Madison, WI (US)

( * ) Notice: Subject to any disclaimer, the term of this patent is extended or adjusted under 35 U.S.C. 154(b) by 355 days.

(21) Appl. No.: 12/501,594

(22) Filed: Jul. 13, 2009

(65) Prior Publication Data

US 2011/0010356 A1    Jan. 13, 2011

(51) Int. Cl.
*G06F 17/30* (2006.01)
(52) U.S. Cl. .................................................. 707/707
(58) Field of Classification Search .................. 707/707
See application file for complete search history.

(56) References Cited

U.S. PATENT DOCUMENTS

| | | | |
|---|---|---|---|
| 6,772,943 B2 | 8/2004 | Segal | |
| 2002/0156827 A1 | 10/2002 | Lazar | |
| 2002/0156853 A1* | 10/2002 | Hyakutake et al. | 709/206 |
| 2007/0146777 A1* | 6/2007 | Cranitch et al. | 358/1.15 |
| 2007/0226174 A1* | 9/2007 | Saito | 707/1 |
| 2009/0092320 A1 | 4/2009 | Berard et al. | |
| 2009/0164790 A1* | 6/2009 | Pogodin | 713/176 |
| 2009/0300068 A1* | 12/2009 | Tang | 707/104.1 |
| 2011/0052064 A1* | 3/2011 | Fosseide et al. | 382/182 |

OTHER PUBLICATIONS

FlyDoc—Fax online, direct marketing software, postal-mail, email, available online at: <http://www.flydoc.com/>, available at least as early as Apr. 20, 2009.

FlyDoc—Online fax and mail software, The FlyDoc Concept, available online at: <http://www.flydoc.com/overview/index.asp>, available at least as early as Apr. 20, 2009.
FlyDoc: On line fax and mail software, How Does the FlyDoc Printer Work?, available online at: <http://www.flydoc.com/overview/how_does_it_work.asp>, available at least as early as Apr. 20, 2009.
FlyDoc: Send postal mail as easily as sending an email with FlyDoc, Postal Mail, available online at: <http://www.flydoc.com/send/postal_mail.asp>, available at least as early as Apr. 20, 2009.
FlyDoc: Emailing: Experience success sending Direct Marketing Campaigns by email with FlyDoc, Send Your Email Without Bandwidth Limitations, available online at: <http://www.flydoc.com/send/email.asp>, available at least as early as Apr. 20, 2009.

(Continued)

*Primary Examiner* — Jorge A Casanova
(74) *Attorney, Agent, or Firm* — Michael Best & Friedrich LLP (57) ABSTRACT

Embodiments of the invention relate to a software-as-a-service ("SaaS") digital document management system ("DDMS"). The DDMS is located remotely from an office building or other place of business on a remote server. The server is connected to one or more databases for storing digital documents or information extracted from the digital documents. A user populates the DDMS by sending digital documents to the server using a computer, an email-enabled scanner, or the like. When a digital document is received at the server, the document is routed to a customer pending queue, information from the digital document is extracted, the digital document is stored in a directory, and the extracted information is stored in a relational database. The extracted information is supplemented or corrected as necessary using a web portal which allows a user to access the digital document and the extracted information. The digital document and the extracted information are then sent to a first destination such as an archive or mail-on-demand (e.g., a mail and print service).

16 Claims, 8 Drawing Sheets

OTHER PUBLICATIONS

FlyDoc: Online document archiving with FlyDoc, Keep Documents Secure for as Long as You Want, available online at: <http://www.flydoc.com/send/archiving.asp>, available at least as early as Apr. 20, 2009.

FlyDoc: Send postal mail and fax directly from your application, FlyDoc Web Services, available online at: <http://www.flydoc.com/send/web_services.asp>, available at least as early as Apr. 20, 2009.

Saas with Esker on Demand, Esker on Demand, available online at: <http://www.esker.com/deliveryware_solutions/eod.asp>, available at least as early as Oct. 20, 2009.

ReadSoft, ReadSoft Documents Brochure, available online at: <http://www.readsoft.com/international/international_files/product_brochure/ReadSoft_DOCUMENTS_brochure.pdf>, 16 pages, 2009.

Oce Professional Printroom Program, Oce in the Printroom Environment, available online at: <http://www.oceusa.com/main/library.jsp?FOLDER%3C%3Efolder_id=2534374302163128&bmUID=1256747374852>, available at least as early as Oct. 19, 2009.

Oce Professional Printroom Program, Level 1: Oce Digital Printroom, available online at: <http://www.oceusa.com/main/library.jsp?FOLDER%3C%3Efolder_id=2534374302163130&bmUID=1256747379805>, available at least as early as Oct. 19, 2009.

Oce Professional Printroom Program, Level 2: Oce Service Printroom, available online at: <http://www.oceusa.com/main/library.jsp?FOLDER%3C%3Efolder_id=2534374302163131&bmUID=1256747511243>, available at least as early as Oct. 19, 2009.

Oce Professional Printroom Program, Level 3: Oce Convergence Printroom, available online at: <http://www.oceusa.com/main/library.jsp?FOLDER%3C%3Efolder_id=2534374302163132&bmUID=1256747621351>, available at least as early as Oct. 19, 2009.

Oce Professional Printroom Program, Level 4: Oce Enterprise Printroom, available online at: <http://www.oceusa.com/main/library.jsp?FOLDER%3C%3Efolder_id=2534374302163133&bmUID=1256747682148>, available at least as early as Oct. 19, 2009.

Oce Professional Printroom Program, Brochure, available online at: <http://www.oceusa.com/main/view_mediajsp?CONTENT%3C%3Ecnt_id=10134198673370191&FOLDER%3C%3Efolder_id=9852723696639267&bmUID=1256747740069>, 8 pages, 2006.

Oce Business Services, Document Lifecycle Management Services and Solutions, available online at: <http://www.obs—innovation.com/services.aspx>, 10 cycles: 1) The Advantages of Advanced Document Lifecycle Services, 2) Copy & Print Management, 3) Fleet Management, 4) Mail Management, 5) Imaging Services, 6) Records Management, 7) eDiscovery Platform, 8) Performance Management, 9) Office Services, 10) Document Needs Assessment, available at least as early as Oct. 19, 2009.

Oce Assessment Service, The Essential First Step: Oce Assessment Service, available online at: <http://www.oceusa.com/main/library.jsp?FOLDER%3C%3Efolder_id=2534374302162970&bmUID=1256748499759>, available at least as early as Oct. 19, 2009.

Oce, Level 1: Oce Smart Office, available online at: <http://www.oceusa.com/main/library.jsp?FOLDER%3C%3Efolder_id=2534374302162971&bmUID=1256748506619>, available at least as early as Oct. 19, 2009.

Oce, Level 2: Oce Convenience Office, available online at: <http://www.oceusa.com/main/library.jsp?FOLDER%3C%3Efolder_id=2534374302162972&bmUID=1256748602119>, available at least as early as Oct. 19, 2009.

Oce, Level 3: Oce Service Office, available online at: <http://www.oceusa.com/main/library.jsp?FOLDER%3C%3Efolder_id=2534374302162973&bmUID=1256748699353>, available at least as early as Oct. 19, 2009.

Oce, Level 4: Oce Enterprise Office, available online at: <http://www.oceusa.com/main/library.jsp?FOLDER%3C%3Efolder_id=2534374302162974&bmUID=1256748749713>, available at least as early as Oct. 19, 2009.

FabSoft, MOST Hosted Saas, available online at: <http://www.fabsoft.com/products/most/saas.shtml>, available at least as early as Oct. 19, 2009.

FabSoft, DocumentMall, Reform 12, 21 pages, Dec. 1, 2008.

FabSoft, Reform 12 Enterprise, 4 pages, Jan. 2008.

Ricoh, "RICOH Reform PDC Simplifies the Complexities of Document Management", Press Release, available online at: <http://www.fabsoft.com/products/ricoh/reformpdc/pr.shtml>, Jan. 6, 2009.

Ricoh, "FabSoft Modular Object Scanning Technology 2.0 Passes RICOH's Compatibility Testing", Press Release, available online at: <http://www.ricoh-usa.com/about/press/releases.asp?id=460>, Feb. 6, 2008.

FabSoft, Reform-Streamline Document Workflow Brochure, available online at: <http://www.fabsoft.com/products/ricoh/downloads/FabSoftBrochures-Ricoh.pdf>, 16 pages, 2009.

FabSoft, Modular Object Scanning Technology (MOST) Brochure, available online at: <http://www.fabsoft.com/products/most/MOST.pdf>, 2 pages, 2009.

Kofax, Software, available online at: <http://www.kofax.com/products.asp>, available at least as early as Oct. 19, 2009.

Kofax, Capture, available online at: <http://www.kofax.com/downloads/datasheets/datasheet-kofax-capture-8-english.pdf>, available at least as early as Oct. 19, 2009.

Kofax, Transformation Modules, available online at: <http://www.kofax.com/downloads/datasheets/datasheet_KTM_062608.pdf>, available at least as early as Oct. 19, 2009.

Kofax, e-Transactions for Invoices, available online at: <http://www.kofax.com/downloads/datasheets/datasheet-kofax-etransactions-english.pdf>, available at least as early as Oct. 19, 2009.

Kofax, Monitor, available online at: <http://www.kofax.com/downloads/datasheets/datasheet-kofax-monitor-english.pdf>, available at least as early as Oct. 19, 2009.

Kofax, Express, available online at: <http://www.kofax.com/downloads/datasheets/datasheet-kofax-express-english.pdf>, available at least as early as Oct. 19, 2009.

Kofax, Paper In, Perfection Out, VRS Virtual ReScan, available online at: <http://www.kofax.com/downloads/datasheets/datasheet-vrs-english.pdf>, available at least as early as Oct. 19, 2009.

Kofax, Front Office Server, available online at: <http://www.kofax.com/downloads/datasheets/datasheet-kofax-front-office-server-english.pdf>, available at least as early as Oct. 19, 2009.

Salesforce.com, "Salesforce.com Announces Force.com Cloud Computing Architecture, Delivering the Power and Flexibility of Cloud Computing to the Enterprise", Press Release, Jan. 17, 2008.

Maileva, Solution Archive Mailieva, The Electronic Archive at the Heart of Activity Maileva is Included in All Offers Management and Document Exchange, French webpage: <http://www.maileva.com/offre_archivage.htm>, English translation included using http://translate.googleusercontent.com, available at least as early as Oct. 20, 2009.

Maileva, Solution Archive Mailieva, Archiving Electronic Legal Value of Letters Sent via Maileva, French webpage: <http://www.maileva.com/offre_archivea.htm>, English translation included using http://translate.googleusercontent.com, available at least as early as Oct. 20, 2009.

Maileva, Technology Maileva: Milestones of a Fully Automated Outsourcing, French webpage: <http://www.maileva.com/concept_technique.htm>, English translation included using http://translate.googleusercontent.com, available at least as early as Oct. 20, 2009.

Maileva, Email Solution Management Maileva, French webpage: <http://www.maileva.com/offre_cg.htm>, English translation included using http://translate.googleusercontent.com, available at least as early as Oct. 20, 2009.

Maileva, Solution Archive Maileva, Table with Wording, Archives, and Edocuweb columns, French webpage: <http://www.maileva.com/tableau_archivage.htm>, English translation included using http://translate.googleusercontent.com, available at least as early as Oct. 20, 2009.

* cited by examiner

DIGITAL DOCUMENT MANAGEMENT SYSTEM

BACKGROUND

The present invention relates to digital document management systems.

Document management systems often interface with a variety of devices in offices or other places of business. For example, a document management system may interface with scanners, printers, and computers via a local area network or intranet to which each device is connected. Many document management systems are designed in a manner that allows a user to scan a document and save the document to a local database, print the document from the local database using a local printer, or view the document from the local database using a local computer.

SUMMARY

Proprietary document management systems store documents locally, are integrated with local devices, and require local maintenance, updates, and administration. Many companies or businesses do not have the resources to obtain or maintain such document management systems. A software-as-a-service ("SaaS") document management system provides greater flexibility and requires fewer resources than a proprietary document management system. For example, a SaaS digital document management system ("DDMS") is located remotely from an office (e.g., on a remote server). The server is connected to one or more databases for storing digital documents and information related to the digital documents. A user or client populates the DDMS (or a designated space within the DDMS) by providing, via computer or scanner, a plurality of digital documents. The digital documents are sent to the system in an asynchronous manner such that additional information required to supplement the documents (e.g., destination, retention period, search terms, etc.) is entered following document submission to the DDMS. Conventional document management systems require users to upload documents individually and provide supplemental information before the document is uploaded (i.e., the documents are uploaded synchronously).

When a digital document is received at the remote server, the document is routed to a customer pending queue based on sender information. Information from the digital document is extracted using, for example, optical character recognition ("OCR"), and the document is stored in a first directory. The extracted information is stored in a relational database or a portion of a relational database (e.g., one or more tables within the relational database). The extracted information is supplemented or corrected, if necessary, using a web-based user interface or portal which allows a user to access the digital document and the extracted information. After the extracted information has been updated as necessary, the digital document and the extracted information are sent to a first destination. In some embodiments, the first destination is an archive where the extracted information is stored and is searchable (e.g., full-text searchable). In other embodiments, the digital document and the extracted information are sent to a mail-on-demand provider (e.g., a mail and print service) that prints, folds, and mails the document. In such embodiments, the extracted information includes a mailing address.

In one particular embodiment, the invention provides a method of managing digital documents at a host device such as a host server that is connected to one or more databases. The method includes receiving, at the host device, a first digital document from a client device over a wide area network, routing the first digital document to a client pending queue associated with a first client account, and extracting a first set of information from the first digital document. The first set of information is stored in a first relational database, and the first digital document is stored in a first directory (e.g., a directory within one of the one or more databases connected to the server). The method also includes generating a web portal that includes the first set of information and the first digital document, receiving, through the web portal, a first set of criteria related to a first document destination, and transmitting the first digital document and the first set of information to the first document destination.

In another embodiment, the invention provides a method of managing digital documents received from one or more client devices that are connected to a host device (e.g., a host server) through a wide area network. The method includes digitizing a first document to generate a first digital document and transmitting the first digital document over the wide area network to the host device. The client device receives a first notification related to a status of the first digital document from the host device, and displays the first digital document and a first set of information in a web portal. The first set of information is extracted from the first digital document. The method also includes populating the web portal with a first set of criteria related to a first document destination for the first digital document and the first set of information.

In another embodiment, the invention provides a software-as-a-service ("SaaS") system for managing digital documents sent from a client to a hosted service. The system includes a host device and one or more client devices. The host device is configured to receive a first digital document, route the first digital document to a client pending queue associated with a first client account, and extract a first set of information from the first digital document. The first set of information is stored in a first relational database, and the first digital document is stored in a first directory of a database (e.g., a database connected to the host device). The host device is further configured to generate a web portal that includes the first set of information and the first digital document, receive, through the web portal, a first set of criteria related to a first document destination, and transmit the first digital document and the first set of information to the first document destination. The one or more client devices are connected to the host device over a wide area network and are configured to digitize a first document to generate the first digital document, transmit the first digital document to the host device, and display the first digital document and the first set of information in the web portal. The first set of information is displayed in an editable interface of the web portal, and the web portal is populated with a first set of criteria related to the first document destination for the first digital document and the first set of information.

In yet another embodiment, the invention provides a method of managing digital documents sent from a client to a hosted service in a software-as-a-service ("SaaS") system. The method includes digitizing a first document to generate a first digital document, transmitting the first digital document over a wide area network to a host device (e.g., a host server), and routing the first digital document to a client pending queue associated with a first client account. The method also includes extracting a first set of information from the first digital document, storing the first set of information in a first relational database, and storing the first digital document in a first database directory. The first digital document and the first set of information are displayed in a web portal, with the first set of information being displayed in an editable interface of the web portal. The host device receives, through the web portal, a first set of criteria related to a first document destination, and transmits the first digital document and the first set of information to the first document destination.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to a software-as-a-service ("SaaS") digital document management system ("DDMS"). The DDMS is located remotely from a client's office building or other place of business on, for example, a remote device or server. The server is connected to one or more databases for storing digital documents or information extracted from the digital documents. A user populates the DDMS by sending digital documents to the server using a computer, an email-enabled scanner, or the like. When a digital document is received at the server, the document is routed to a customer pending queue based on sender information such as, for example, a sender email address or user login information. Information from the digital document is extracted using optical character recognition ("OCR") or another suitable information extraction technique, and the digital document is stored in a first directory. The extracted information is stored in, for example, a relational database or a portion of a relational database (e.g., one or more tables within the relational database). The extracted information is supplemented or corrected, if necessary, using a web-based user interface or web portal which allows a user to access the digital document and the extracted information. After the extracted information has been updated as necessary, the digital document and the extracted information are sent to a first destination. In some embodiments, the destination is an archive where the extracted information is searchable (e.g., full-text searchable) by the user. In other embodiments, the digital document and the extracted information are sent to a mail-on-demand ("MOD") provider that prints, folds, and mails the digital document for the user. In such embodiments, the extracted information includes a mailing address, a recipient name, or the like.

Figure 1:
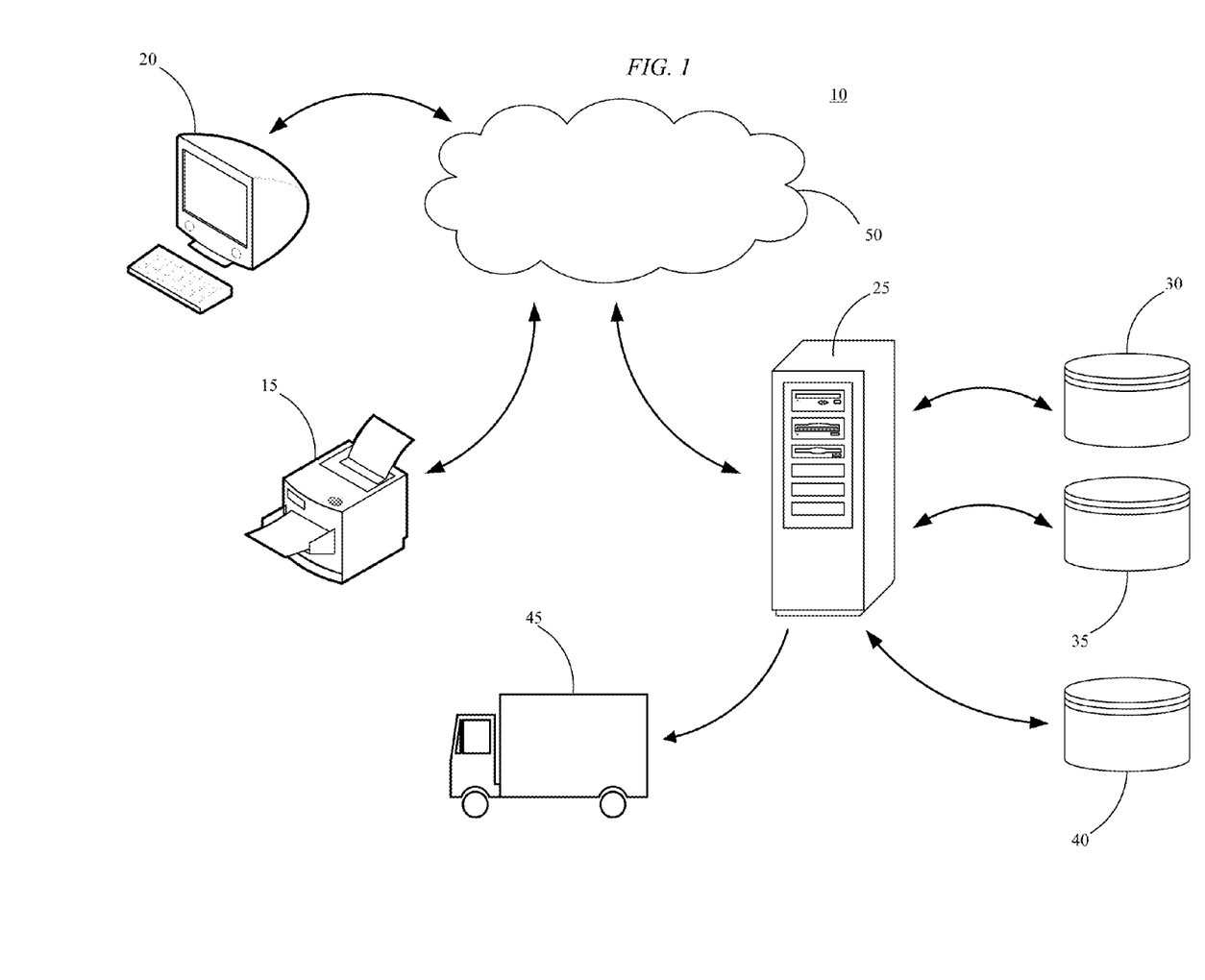
FIG. 1 illustrates a digital document management system ("DDMS") according to an embodiment of the invention.

FIG. 1 illustrates a DDMS 10 that includes a scanner 15, a computer 20, a server or host device 25, a first database 30, a second database 35, a relational database 40, and a mail and print service 45. A document is digitized using the scanner 15 to create a digitized version of the document or a digital document. The scanner 15 is configured to connect to the server 25 through a wide area network ("WAN") 50 such as the Internet, and email a scanned document to the server 25 using an email address and standard transfer protocol. Additionally or alternatively, the digital document can be sent to the server 25 using the computer 20 or another Internet-enabled computing device such as a smartphone or netbook. For example, in one embodiment, a user uses an email client such as Outlook to email the document to the server 25's email address. In other embodiments, the user logs in to a Web interface and uploads the digital document directly to the server 25 using the computer 20. The server 25 is configured to extract information from the digital document and store both the digital document and the extracted information in, for example, the first database 30, the second database 35, the relational database 40, or a combination thereof. The server 25 is also configured to send the digital document and the extracted information to a first destination for post-submission processing, such as the mail and print service 45. The mail and print service 45 uses the extracted information, such as a mailing address or recipient name, to prepare a single or multiple piece mailing for the user. As an illustrative example, the mail and print service 45 receives a digital document which is, for example, a business letter or invoice. The document includes a recipient name and address which were extracted by the DDMS 10. The mail and print service prints the document and prepares an envelope with the extracted recipient name and address. The document is then folded, if necessary, stuffed in the envelope, and mailed. The user is able to track the progress of such a mailing via the computer 20.

Figure 2:
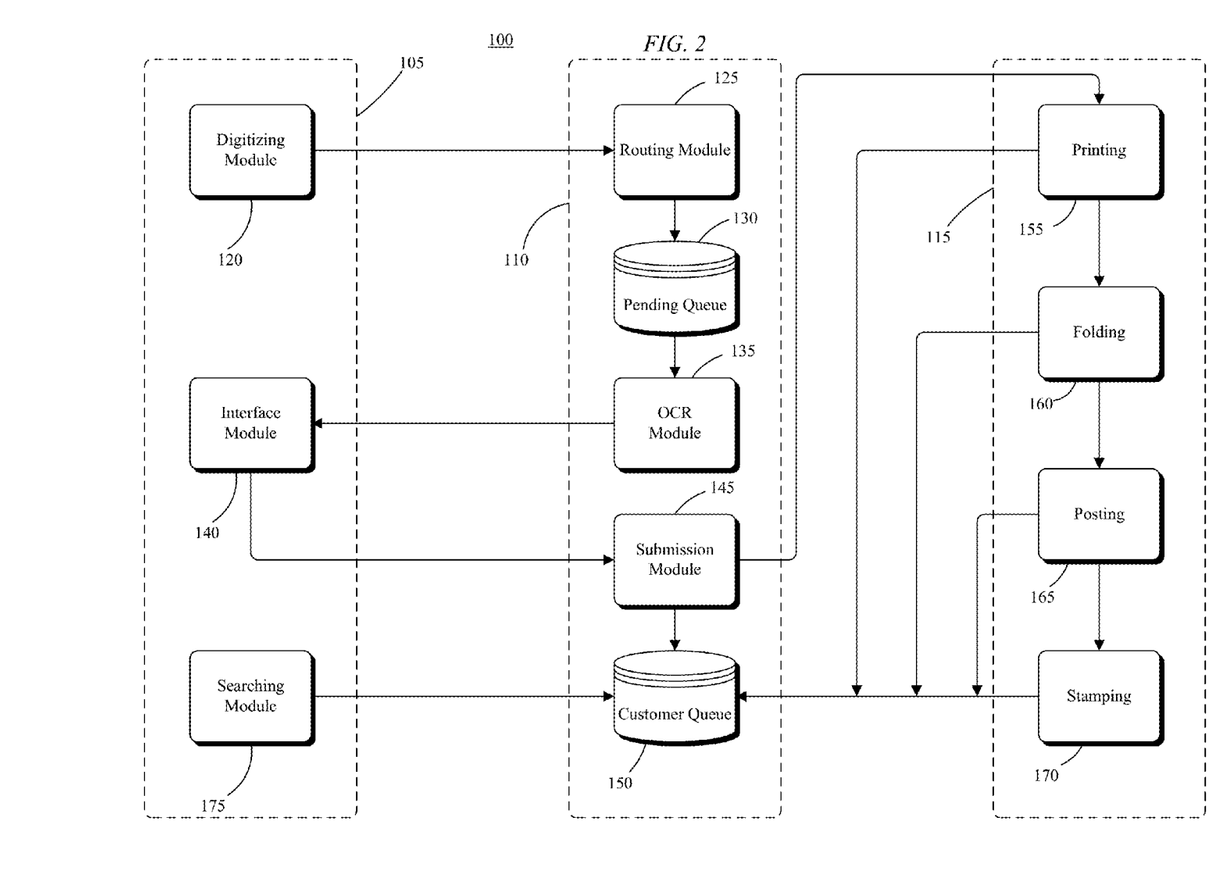
FIG. 2 is a document flow diagram for the DDMS of FIG. 1 according to an embodiment of the invention.

FIG. 2 illustrates a document flow process 100 for the DDMS 10 that includes three stages or operational sections. A user stage 105 is configured for a user to provide documents to the DDMS 10, search the DDMS 10, and provide additional or corrected information to the DDMS 10. A host stage 110 is configured for the processing, updating, storing, and accessing of information stored in the DDMS 10, and an optional handling stage 115 is configured for taking information stored in the DDMS 10 and providing it to, for example, the mail and print service 45.

A user digitizes or scans a document in a digitizing module 120 using, for example, the email-enabled scanner 15. In some embodiments, the scanner 15 is configured to scan multiple documents at once (i.e., in a single scanning process). The multiple documents are separated, if necessary, in a splitting interface of the DDMS 10. In embodiments of the invention that include a splitting interface, the splitting interface is incorporated into a web portal. The scanner 15 sends the digital document to a host device, such as server 25, using an email address and a standard transfer protocol. For example, the email-enabled scanner 15 prompts a user for login credentials or to enter a recipient email address (i.e., an email address associated with the DDMS 10). In one embodiment, the email address is, for example, clientname@service.com. The email is routed to the host device 25 based on the domain name in the email address (i.e., service.com). After the host device 25 receives the digital document, a routing module 125 routes the digital document to an appropriate client pending queue 130 based on the local part of the email address (i.e., clientname), a sender's email address, or other metadata. In other embodiments, the local part of the email address can include a mailing address for the digital document. For example, the digital document is sent to the host device 25 using an email address with a format of addressline1-addressline2-addressline3@service.com. In such an embodiment, the host device 25 parses the email address to obtain the mailing address, and the digital document is routed to the client pending queue 130 based on, for example, metadata. A single client pending queue is linked to one or more email addresses, or multiple client pending queues are linked to a single email address. In some embodiments, the digital documents sent from the scanner 15 to the DDMS 10 are sent encrypted with a public key. The digital documents are stored in the DDMS 10 in an encrypted format such that only a user, accessing the DDMS 10 using a device (e.g., a computer, smartphone, etc.) that includes the correct local private key is able to access the digital document. In other embodiments, the digital document is sent to the host device 25 over the Internet using a secure socket layer ("SSL") or transport socket layer ("TSL") cryptographic protocol instead of email.

The digital documents are sent from the client pending queue 130 to an OCR module 135, which is configured to extract information from the digital document. In one embodiment, the OCR module 135 is configured to extract a previously defined set of fields, such as a name, an address, or an invoice number. In other embodiments, the OCR module 135 is configured to extract all of the text from the digital document. If no data fields are defined for extraction or if the OCR module 135 is unable to extract one or more of the defined data fields, the OCR module 135 extracts all of the text from the document and/or the DDMS 10 notifies the user that a data extraction error has occurred.

The digital document and the extracted information from the digital document are stored in either the host device 25 or one or more databases connected to the host device 25. In one embodiment, the host device 25 is connected to the first database 30 which is configured to store the digital document in a first directory associated with the client name or account. In some embodiments, the first directory includes at least one subdirectory for storing digital documents according to a date, a recipient, a subject, or the like. The extracted information is stored in the relational database 40. For example, each piece, field, or element of information that is extracted from the digital document is associated with a particular heading, category, or data field. The digital document and extracted information are linked together or are provided with a unique identification number (or code) to ensure that the extracted information and digital document are correspondingly presented in the web portal, or correctly sent together to a destination (e.g., the mail and print service 45).

As an illustrative example, a digital document includes an invoice number which is extracted from the digital document as an invoice number data field. Additional information is extracted as other fields, such as a date, a sub-total, and a total. The relational database 40 is structured such that one table within the relational database includes the invoice numbers extracted from each invoice sent to the DDMS 10. A second table within the relational database 40 includes the additional information that is extracted from the digital document (e.g., date, sub-total, total, etc.), as well as the invoice number. A query of the relational database 40 for an invoice (i.e., a document type) returns, for example, the table that includes the invoice numbers extracted from each of the invoices sent to the DDMS 10. A query of the relational database 40 for a particular invoice number (i.e., a data field within the invoice) returns the row that includes the additional information extracted from the digital document (e.g., date, sub-total, total, etc.). In other embodiments, additional information can be extracted from the digital document, such as a name, an address, a product ID, a service ID, and the like.

Following the extraction and storage of the data fields from the digital document, the DDMS 10 generates a notification message to send to the user related to the digital document and the extracted information. In one embodiment, the DDMS 10 sends an email to the user indicating that a digital document has been saved to the first database 30. The notification message includes a link to, for example, an interface module 140 that includes the web portal. The web portal allows the user to, among other things, access the digital document, view the extracted information, correct the extracted information, supplement the extracted information, or search for additional digital documents. The web portal is generated by the host device 25, is customized to the client's needs (e.g., information presented, layout, etc.), and incorporates, for example, server-side scripting. In some embodiments, the web portal is generated even if the user does not access it. In other embodiments, the web portal is only generated or is only populated with information (e.g., extracted information and digital documents) when the user accesses it. The web portal is described in greater detail below. If the user adds to or corrects the extracted information, the extracted information stored in the relational database 40 is updated upon submission of the changes or additions. In other embodiments, the relational database 40 is updated automatically without requiring the user to submit changes.

In the embodiment of the invention illustrated in FIG. 2, a submission module 145 accesses or gathers the digital document and the extracted information from the first database 30 and the relational database 40 and prepares each for submission to the mail and print service 45. Preparing the digital document and extracted information for submission includes formatting each of the digital document and the extracted information based on mailing criteria from the user. In some embodiments, the mailing criteria are established or set using the web portal. Setting mailing criteria is described in greater detail below. The submission module 145 submits the digital document and the extracted information to the mail and print service 45 and provides an indication to a customer queue 150 that a mailing project has been initiated. As illustrated in FIG. 2, the mailing service 45 includes a printing section 155, a folding section 160, a posting section 165, and a stamping or postage section 170. In some embodiments, the stamping section 170 is before the posting section 165, or stamping is completed by, for example, the U.S. Postal Service at a later time. After each step of the mailing process, status updates are sent to the customer queue 150 to update the user as to the progress of the mailing. The user is able to access and monitor the progress of a particular mailing project using the web portal and a search module 175 for searching the pending projects in the customer queue 150. In some embodiments, notifications of the status of a mailing project are sent to a user as an email or a text message.

Figure 3:
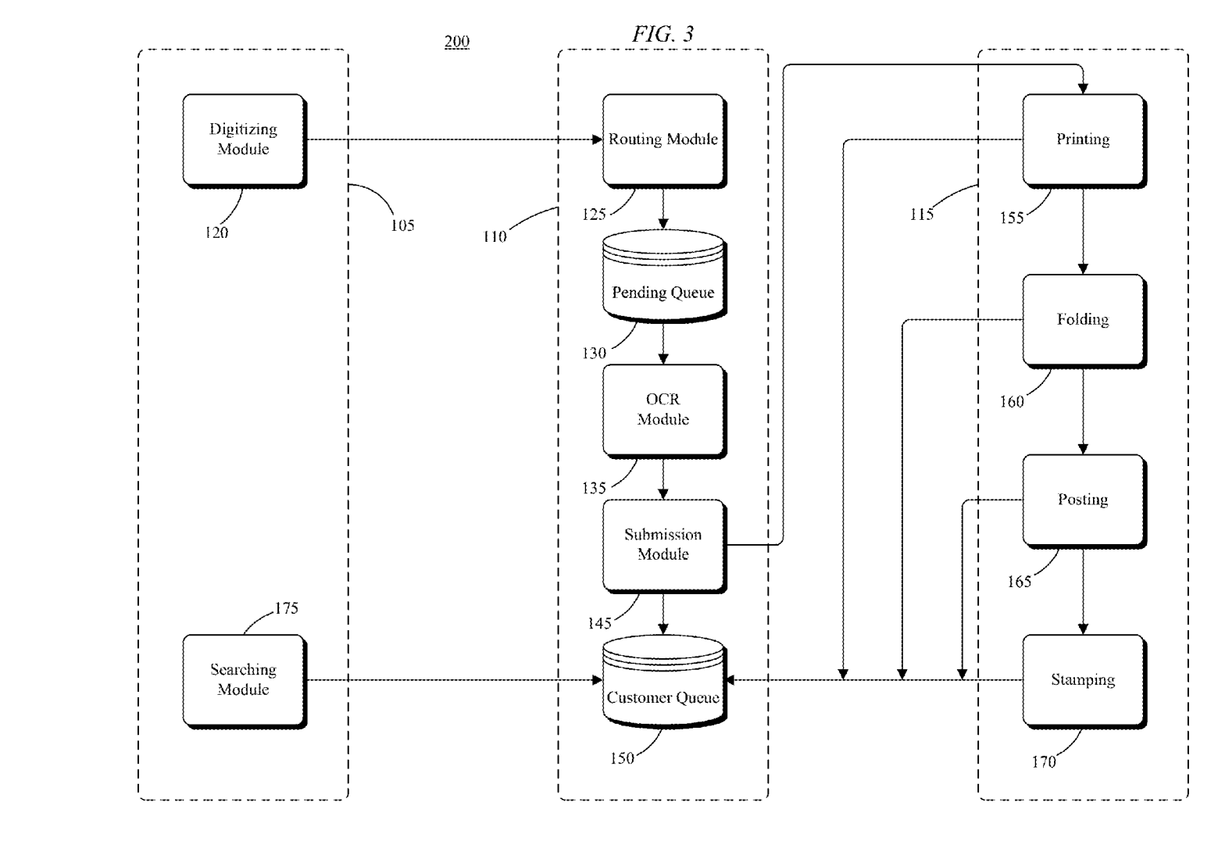
FIG. 3 is a document flow diagram for the DDMS of FIG. 1 according to another embodiment of the invention.

FIG. 3 illustrates another document flow process 200 for the DDMS 10. The process 200 is similar to the process 100 described above with respect to FIG. 2. However, in process 200, after the digital document and the information extracted from the digital document have been stored in the first database 30 and the relational database 40, respectively, the DDMS 10 does not request additional or corrected information from the user. Rather, the digital document and the extracted information from the digital document are sent directly to the submission module 145. The process 200 is implemented when a digital document is know by, or has been taught to, the DDMS 10. For example, if a client repeatedly sends or receives a particular type of document, the DDMS 10 learns (or is taught) the format of the document and is able to recognize the document, extract a set of information fields from the document (in the OCR module 135), and prepare the document for mailing without the user having to correct or otherwise verify the extracted information. The process of training the DDMS 10 (e.g., generating a document template for a particular type of document) is similar to that described with respect to U.S. patent application Ser. No. 11/866,423, titled "DOCUMENT RECOGNITION USING STATIC AND VARIABLE STRINGS TO CREATE A DOCUMENT SIGNATURE," filed Oct. 3, 2007, the entire contents of which are hereby incorporated by reference.

When the DDMS 10 recognizes a digital document, the document template is applied in the OCR module 135 to ensure that the information fields are properly extracted. Because the digital document is known by the DDMS 10, no notification is sent to the user requesting an update to or validation of the extracted information. The DDMS 10 then forwards the digital document and the extracted information to the submission module 145 where they are prepared for submission to the mail and print service 45, and the customer queue 150 is updated.

Figure 4:
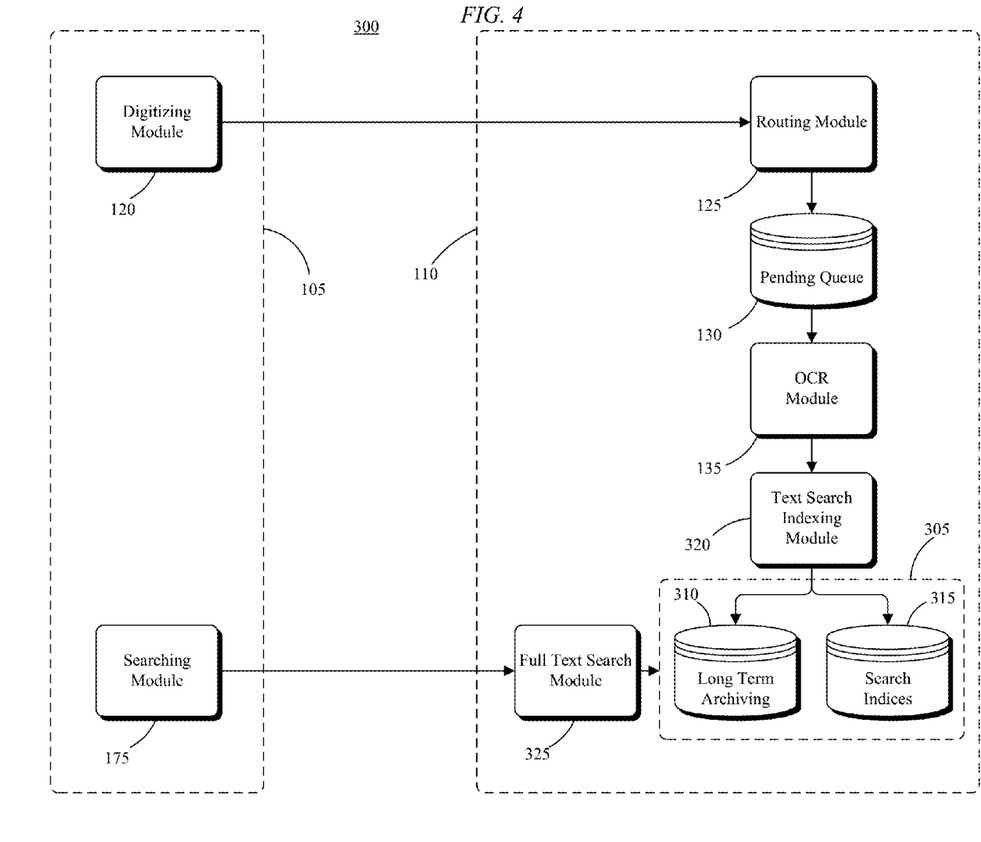
FIG. 4 is a document flow diagram for the DDMS of FIG. 1 according to another embodiment of the invention.

FIG. 4 illustrates a document flow process 300 for the DDMS 10. In the illustrated embodiment, the mailing service 45 described above with respect to FIGS. 2 and 3 is replaced with a data archive 305. The data archive 305 includes a long term archiving database 310 which is operable to store digital documents and other files, and a search index database 315 (e.g., a full-text-search ("FTS") index database). The search index database 315 is configured to store extracted information from the document, file names, metadata, sender information, and the like. The information stored within the search index database 315 is used for searching and identifying digital documents or files stored in the data archive 305.

In a manner similar to that described above with respect to FIG. 2, a user digitizes or scans a document using, for example, the email-enabled scanner 15 that sends the digital document to the host device 25. The digital document is sent from the client pending queue 130 to the OCR module 135 which is configured to extract information from the digital document. After information from the digital document has been extracted, the extracted information is prepared for archiving and text searching in a text search indexing module 320. In some embodiments, the extracted information is compiled into a search index that includes one or more tables, such that the one or more tables include all of the data fields extracted from a single digital document.

A user accesses a full text search module 325 and the archive 305 through the web portal to search for digital documents or extracted information from the digital documents. In one embodiment, the user is able to access digital documents and the extracted information simultaneously such that both the digital document and the extracted information are displayed on a single screen (i.e., the digital document and the extracted information are visible at the same time). In other embodiments, only the digital document or the extracted information is visible at a single time. In some embodiments, when the extracted information is displayed in the web portal, it is displayed in an editable interface which allows a user to modify, correct, or validate the extracted information. Validating the extracted information ensures that the extracted information is correct (e.g., a correct invoice number or total).

Figure 5:
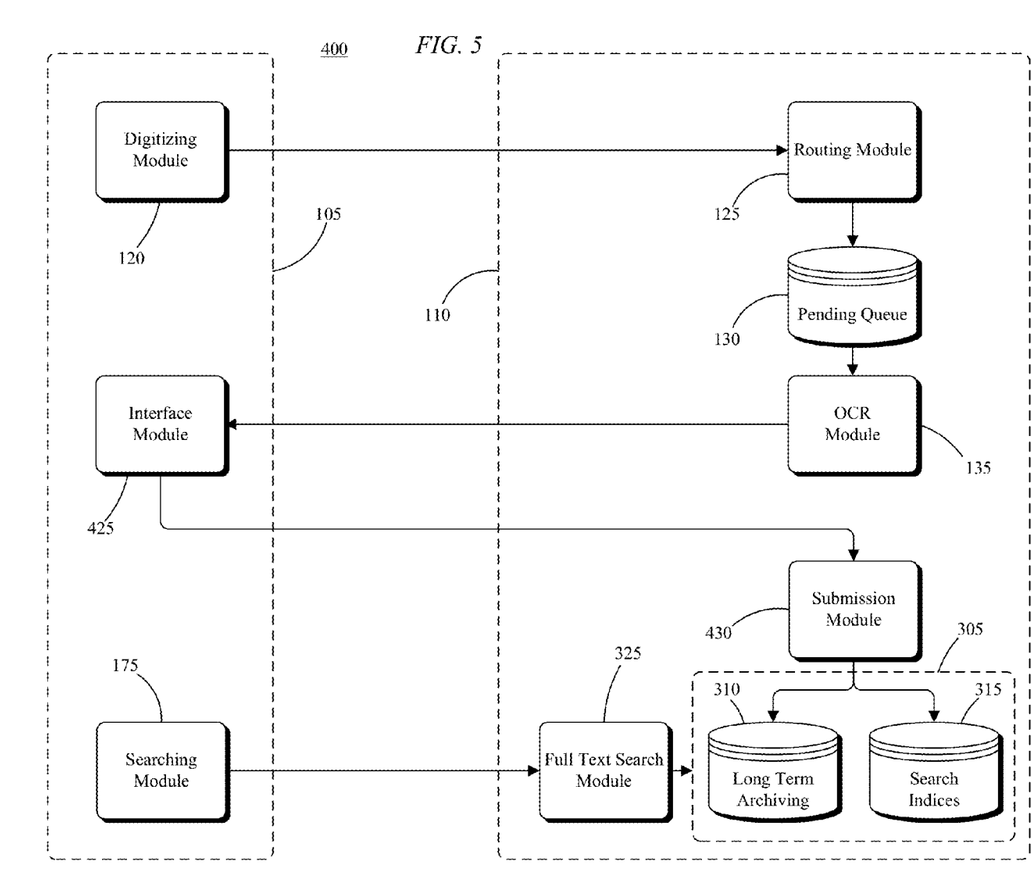
FIG. 5 is a document flow diagram for the DDMS of FIG. 1 according to another embodiment of the invention.

FIG. 5 illustrates a document flow process 400 similar to that described above with respect to FIG. 4. The document flow process 400 includes an interface module 425 between the OCR module 135 and a submission module 430. The interface module 425 allows a user to enter information such as, for example, text search fields (e.g., keywords for text searching) and a retention value. In some embodiments, the user enters all of the keywords for text searching. The retention value is a value for which the digital document and the extracted set of keywords (or extracted full text) are retained in the archive 305. In some embodiments, a digital document is retained indefinitely (i.e., the document remains in the archive until it is manually deleted by a user). In other embodiments, the retention period is selected as a number of days, months, or years for which the digital document is to remain in the archives The retention period can be automatically or manually selected based on, for example, document type (e.g., to satisfy certain legal file retention periods), a user defined priority level, or sender (i.e., the entity that sent the document). The user enters the index and retention values via the web portal and submits the information for archiving via a submit button. In some embodiments, the information is submitted to the archive 305 based on a timer, a user scheduled information submission, or automatically.

Figure 6:
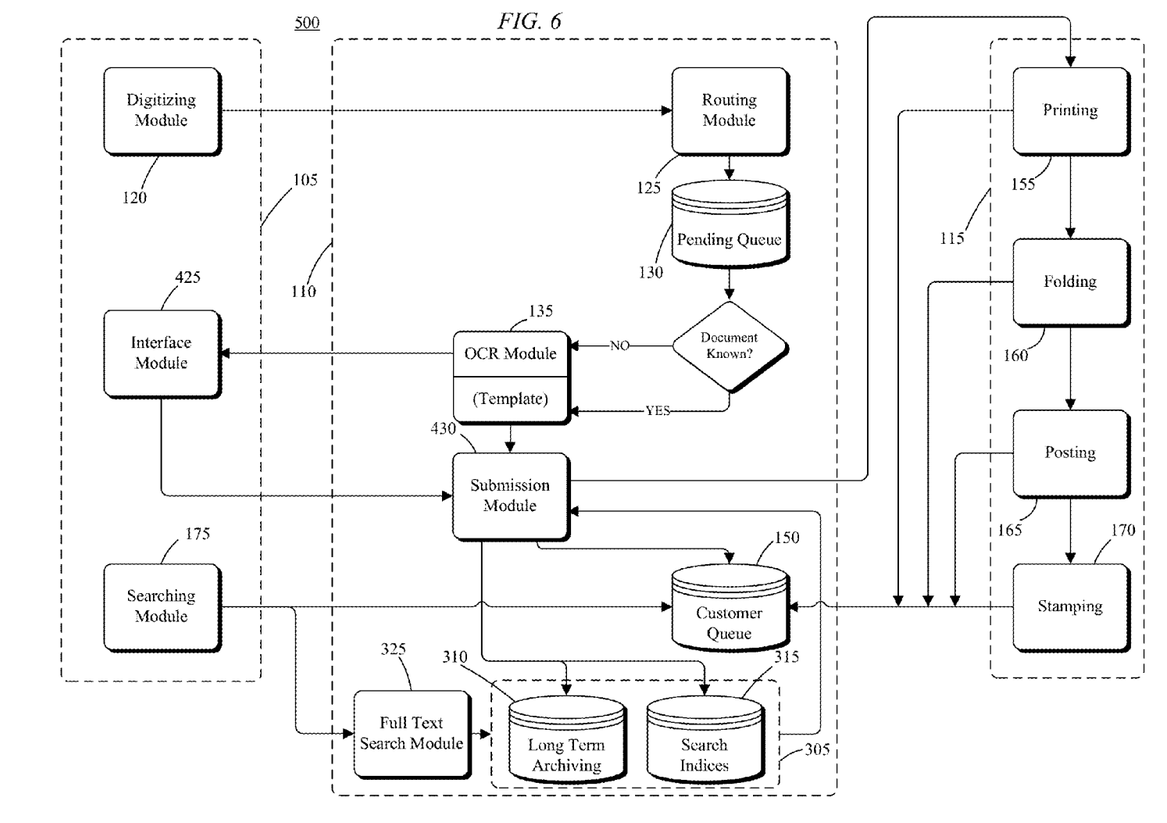
FIG. 6 is a document flow diagram for the DDMS of FIG. 1 according to another embodiment of the invention.

FIG. 6 illustrates a document flow process 500 that incorporates both archiving and post-submission processing. Similar to the document flow process 100 described above with respect to FIG. 2, the document flow process 500 includes three operational sections. The user stage 105 includes a user sending documents to the DDMS 10, searching the DDMS 10, and providing additional or corrected information to the DDMS 10; the host stage 110 includes the processing, updating, storing, and accessing of information stored in the DDMS 10; and an optional post-submission processing stage includes taking information stored in the DDMS 10 and providing it to, for example, the mail and print service 45, and accounting service, or the like.

The user digitizes the document as described above and sends the digital document to the host device 25 using an email address and standard transfer protocol. The routing module 125 routes the digital document to the client pending queue 130. While in the client pending queue 130, the DDMS 10 determines whether the document is known (e.g., the document type, format, layout, etc.) by comparing it to stored document templates. If the document is recognized, a document template is used in the OCR module 135 to extract the necessary data fields and the document is submitted directly to a submission module 430. If the DDMS 10 does not recognize the digital document, the document is sent to the OCR module 135 for data field extraction, as described above, and the host device generates a notification message to send to the user related to the digital document and the extracted information. In one embodiment, the host device 25 sends an email to the user indicating that the extracted information requires updating. The notification message includes a link to the web portal which allows the user to access an image of the digital document, view the extracted information, correct the extracted information, and/or supplement the extracted information. After the user has completed supplementing, correcting, or otherwise updating the extracted information, the relational database 40 is updated and the document and extracted information are sent to the submission module 430. In the submission module 430, the digital document and the information extracted from the digital document are sent to the archive 305, a post-processing service (e.g., the mail and print service 45), or both. In some embodiments, the user selects the destination of the digital document using the web portal.

In other embodiments, default destination settings are established based on, for example, document type, document template, or sender.

The submission module 430 prepares the digital document and the extracted information for submission to the archive 305 or the post-processing service, and provides indications to the customer queue 150 related to the status of the submission. If the document is sent to the mail and print service 45, the digital document and extracted information are prepared for mailing based on the set of mailing criteria defined by the user. The user is able to access and monitor the progress of a particular mailing project using the web portal.

If the digital document is sent to the archive 305, the extracted information is prepared for archiving and text searching as described above. A user is able to access the archive through the web portal and conduct searching for a specific digital document or the extracted information from the digital document. The user is able to access digital document and the extracted information such that both the digital document and the extracted information are displayed simultaneously.

In some embodiments, the user is also able to select a digital document stored in the archive 305 and send the document to the mail and print service 45. In such embodiments, the document is sent to the submission module from the archive where it is prepared for the mailing service 45. For example, the archive 305 may contain a document which is repeatedly mailed to a vendor or distribution list and does not require updating (or does not require significant updating). In such a situation, the user accesses the document in the archive 305, and selects the document for mailing. If any mailing information requires updating, the user can update the extracted information in the web portal without having to resend the document to the archive 305. After the necessary updates have been made, the document is sent to and processed by the mail and print service 45 as described above with respect to FIG. 2.

Figure 7:
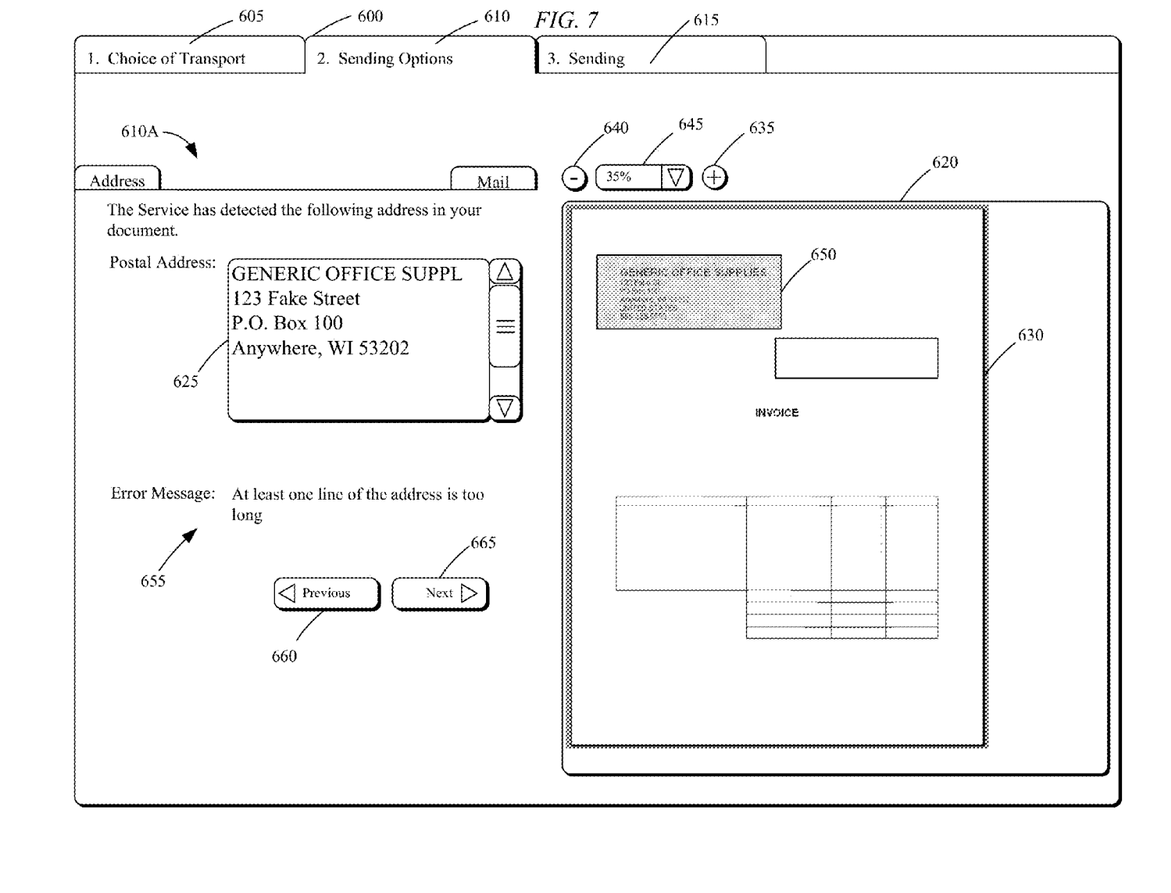
FIG. 7 is a diagram of a user interface for the DDMS of FIG. 1 according to an embodiment of the invention.

FIG. 7 illustrates a web portal 600 for accessing the DDMS 10. In the illustrated embodiment, the web portal 600 includes three tabs. A first tab 605 is identified as "select transport" and allows a user to select the method by which a digital document is transmitted or transported. In embodiments of the invention, digital document transport methods include being printed and mailed (e.g., by the mail and print service 45), faxed, or forwarded electronically. In embodiments where the digital document is forwarded electronically, the document can be emailed, electronically sent to a fax machine, or copied to a compact disk or flash drive and delivered to a recipient. For example, if the final destination is an accounting service, the document is sent using multiple formats (e.g., hard copy, electronic version, fax, etc.) to ensure that the accountant receives proper financial documentation. In some embodiments, the first tab 605 is not included in the web portal 600. Instead, the transport type is selected based on information extracted from the document, or the local part of an email address. For example, if the sends a document to fax@service.com, the transport type is selected as fax.

Figure 8:
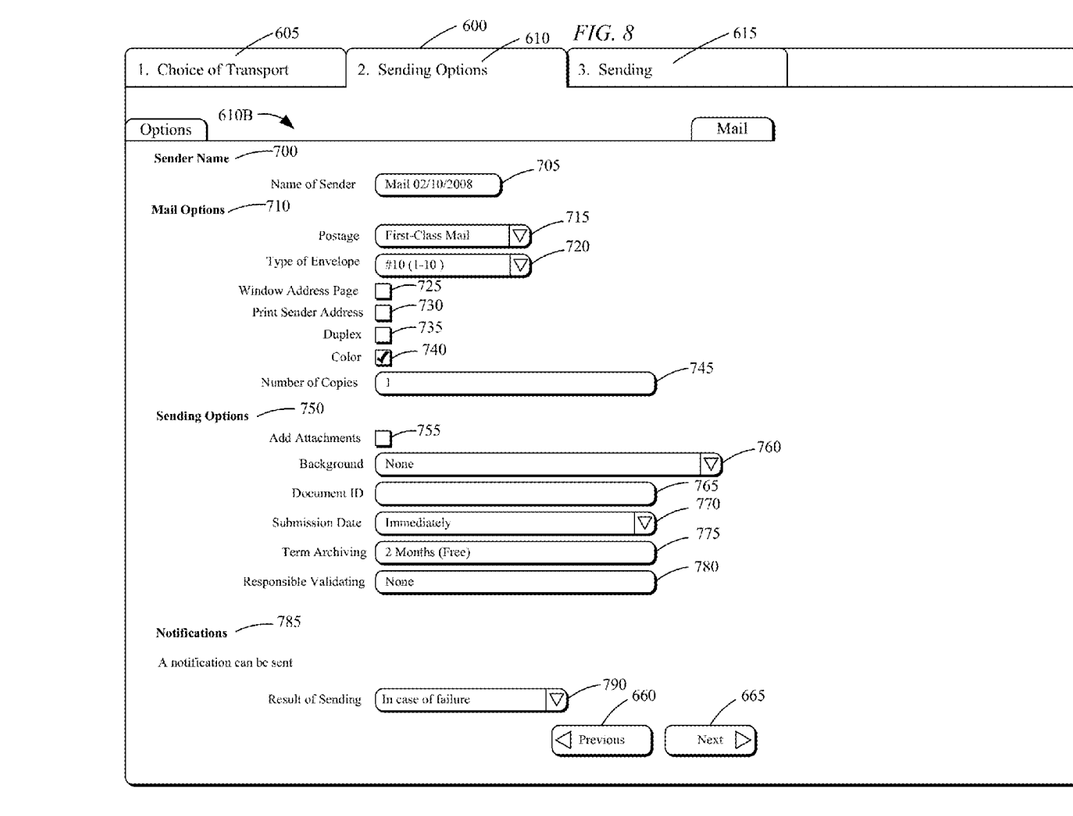
FIG. 8 is a diagram of a user interface for the DDMS of FIG. 1 according to an embodiment of the invention.

A second tab 610 is identified as "sending options" and allows the user to select various sending options for a digital document. In FIGS. 7 and 8, the sending options tab is illustrated with respect to a transport selection of "mail and print service." Embodiments of the sending options tab for the other transport types are similar in architecture and form, but vary in the information presented or requested. For example, if the user selects a fax transport type, the user is prompted to enter a fax number, recipient, and the like.

A third tab 615 is identified as "sending" and is configured to provide the user with a summary of the information entered in the web portal 600, and includes a submission button for submitting the information to the host device 25. In some embodiments, the sending tab 615 provides an indication of the changes the user made to the extracted information. The sending tab also includes links to other features of the web portal 600, such as the customer queue 150 and the search module 175.

The web portal 600 is generated by the host device 25 and displayed by, for example, an Internet-enabled computer or device running a browser. The web portal 600 includes dynamic web pages which utilize server-side scripting (e.g., using JavaScript) to modify the sequence or reload of pages in the web portal (i.e., the web pages sent to a user's browser). Server-side scripting allows the web portal 600 to dynamically interface with the host device 25, the databases connected to the host device 25, and to update or access information in the databases, as necessary. In some embodiments, the web portal 600 uses a combination of server-side and client-side scripting.

The user populates input portions of the web portal 600 (e.g., text boxes, check boxes, etc.) by entering text via a mechanical or virtual keyboard, and using a pointing or selection device such as a mouse to control a curser on a display screen. Input signals from the keyboard and the mouse are received and processed by a computer and translated into a visual result or action in the web portal. For example, if the user enters text using a keyboard, the activated keys produce signals which are represented as type-written text in the web portal 600. Similarly, a mouse click which corresponds to a location of the cursor on the screen results in selecting/deselecting a check box, highlighting text, etc.

FIGS. 7 and 8 illustrate first and second pages 610A and 610B (e.g., webpages or screens) of the sending options tab 610, respectively. The first page 610A (FIG. 7) includes a first viewing screen 620 and an extracted information section 625. The first viewing screen 620 provides a visual representation of a digital document 630. The document 630 is sized such that the entire digital document 630 is viewable in the viewing screen 620 without requiring the user to scroll or zoom. Above the first viewing screen 620 are a zoom-in button 635, a zoom-out button 640, and a zoom-select dropdown menu 645. The user is able to modify the zoom level of the document 630 to view smaller details of the digital document 630 (i.e., zoom in) or view multiple pages of a digital document 630 in the first viewing screen 620 (i.e., zoom out). In some embodiments the first page 610A of the sending options tab 610 includes multiple viewing screens or can have a default zoom setting such that all pages of a multi-page digital document 630 are simultaneously viewable.

The first viewing screen 620 also identifies an area of the digital document by highlighting an area 650 of the viewing screen 620. If the highlighted area 650 includes a portion of the digital document 630 that was extracted, the extracted information is displayed in the extracted information section 625. The highlighted area 650 is moved to different locations to change the extracted information that is displayed. In some embodiments, the size of the highlighted area 650 is adjustable to include more or less of the digital document 630.

The extracted information is displayed in the extracted information section 625 (i.e., an editable interface of the web portal 600) and can be supplemented or modified by entering new or replacement text. For example, if the OCR module 135 incorrectly extracted the address, the address can be corrected to ensure that the digital document 630 is sent to the correct address when it is printed and mailed. In some embodiments, the size of the extracted information section 625 is adjustable. For example, if a user wants to view all of the extracted information from a digital document 630, the extracted information section 625 and/or the highlighted area 650 are resized to include all of the extracted information for the digital document 630 (or at least one page of a multi-page digital document). In some embodiments, information is presented in the extracted information section 625 in a relative position corresponding to the location of the extracted information in the digital document 630. As such, the layouts of the first viewing screen 620 and the extracted information section 625 are the same, the difference being that the first viewing screen 620 provides a visual representation of the actual document 630, and the extracted information section 625 provides a user-editable representation of the digital document 630.

The first page 610A of the sending options tab 610 also includes an error message section 655 which provides a user with a visual indication that the extracted information does not conform to one or more rules (e.g., postal address rules, or printing limitations, etc.). For example, if the digital document 630 is being printed and mailed, rules are applied to the extracted information related to the number of lines allowed for an address, the number of characters allowed in each line of the address, and the general formatting of the address (e.g., the city-state-postal code notation). If one or more of the rules is violated by the extracted information, the user is prompted by the error message section 655 to correct the error. In some embodiments, the user is not allowed to advance to the second page 610B of the sending options tab 610 until all errors are resolved. The first page 610A of the sending options tab 610 also includes navigation buttons (e.g., previous and next buttons 660 and 665) for navigating through the web portal 600. When all extracted information has been corrected, supplemented, or updated, the user proceeds to the second page 610B of the sending options tab 610 to select specific mailing options for the document 630.

In the illustrated embodiment (FIG. 8), the second page 610B of the sending options tab 610 includes four sections. A sender name section 700 includes a sender name text box 705 or similar data entry element which allows the user to manually enter the name of the sender (e.g., company name, user name, etc.). In some embodiments, the sender name text box 705 is automatically filled based on an extracted data from the digital document 630 or a name linked to the client account.

A mailing options section 710 allows the user to select specific mailing preferences for the digital document 630. For example, the user selects a postage type 715 (e.g., first-class mail) and an envelope type 720 (e.g., #10, #12, #14, etc.). The mailing options section 710 also includes data entry elements that allow the user to select whether the mailing should include a window address page 725 (e.g., a page inserted into an envelope that includes the address of the recipient), whether the sender address should be included 730, whether the document should be printed duplex 735 (e.g., front and back), whether the document should be printed in color 740, and the number of copies of the document which need to be mailed 745.

A sending options section 750 allows the user to select specific sending options related to the digital document. For example, the user selects, using corresponding data entry elements, whether any attachments should be included (e.g., additional digital documents) using an add attachments check box 755, whether a background should be included on the printing paper (using dialog box 760), and whether a document ID should be included (using a document ID dialog box 765) (e.g., an ID for identifying the document in the DDMS).

The sending options section 750 also allows the user to select a submission or mailing date for the digital document (with a submission date box 770) (e.g., immediately, next day, next week, last day of the month, etc.), a term archiving period (using box 775) (e.g., the length of time that documents and/or extracted information are stored in the archive 305, the customer queue 150, or another database connected to the host device 25), and whether the mailing should include responsible validating information (e.g., confirmation of receipt by the recipient) (with a dialog box 780).

A notifications section 785 allows the user to define one or more criteria 790 for which notification messages are sent to one or more users. For example, the user selects a notification type (e.g., an email, a text message, fax, etc.) to be sent upon the successful completion of the mailing, the failure of the mailing, and the like. In some embodiments, the user is notified via email or text message when a status of the mailing project has changed (e.g., when printing is completed, when folding is completed, etc.).

In other embodiments of the invention, the web portal 600 includes additional tabs or buttons which provide additional functions and control to the user. For example, an optional splitting interface (not shown) is included to allow the user to divide the pages of a single scanning process into multiple documents. Each of the multiple documents are saved or stored individually to the DDMS 10. The splitting interface allows the user to select beginning and ending pages of each of the multiple documents, send the documents individually to destinations (e.g., mail service, archive, etc.), or modify the extracted information from each document individually. In some embodiments, the splitting interface is also configured to combine one or more documents into a larger document. The web portal 600 can also include a "teach" button which is activated by a user when the user wants the DDMS 10 to learn a document (as described above) based on the extracted data fields.

Thus, the invention provides, among other things, a digital document management system ("DDMS") that is configured to receive digital documents from a plurality of sources, extract information from the digital documents, and send the digital document and the extracted information to one or more destinations, such as a mail and print service or an archives Various features and advantages of the invention are set forth in the following claims.

What is claimed is:

1. A method of managing digital documents, the method comprising:
    simultaneously receiving, at a host device, a first set of digital documents from a client device over a wide area network, the first set of digital documents including a first digital document and a second digital document, the first set of digital documents generated from a single digitizing process;
    separating the first digital document and the second digital document;
    routing the first digital document and the second digital document to a client pending queue associated with a first client account;
    extracting a first set of structured information from the first digital document;
    storing the first set of structured information in a first relational database;
    storing the first digital document in a first directory;
    generating a web portal that includes the first set of structured information and the first digital document;
    receiving, through the web portal, a first set of criteria related to a first document destination;

transmitting the first digital document and the first set of structured information to the first document destination;
extracting a second set of structured information from the second digital document;
storing the second set of structured information in the first relational database;
storing the second digital document in the first directory;
receiving, through the web portal, a second set of criteria related to a second document destination; and
transmitting the second digital document and the second set of structured information to the second document destination.

2. The method of claim 1, wherein the first document destination is an archive.

3. The method of claim 1, wherein the first document destination is a mail and print service.

4. The method of claim 1, further comprising receiving, through the web portal, an updated first set of structured information.

5. The method of claim 4, further comprising updating the first set of structured information stored in the first relational database using the updated first set of structured information.

6. A system for managing digital documents, the system comprising:
   a host device configured to
      receive a first set of digital documents, the first set of digital documents including a first digital document and a second digital document;
      separate the first digital document and a second digital document;
      route the first digital document and the second digital document to a client pending queue associated with a first client account;
      extract a first set of structured information from the first digital document;
      store the first set of structured information in a first relational database;
      store the first digital document in a first directory;
      generate a web portal that includes the first set of structured information and the first digital document;
      receive, through the web portal, a first set of criteria related to a first document destination; and
      transmit the first digital document and the first set of structured information to the first document destination;
      extract a second set of structured information from the second digital document;
      store the second set of structured information in the first relational database;
      store the second digital document in the first directory;
      receive, through the web portal, a second set of criteria related to a second document destination; and
      transmit the second digital document and the second set of structured information to the second document destination; and
   one or more client devices connected to the host device over a wide area network, the one or more client devices configured to
      digitize a first document and a second document to generate the first set of digital documents, the first set of digital documents generated from a single digitizing process;
      transmit the first set of digital documents to the host device;
      display the first digital document and the first set of structured information in the web portal,
      wherein the first set of structured information is displayed in an editable interface of the web portal; and
      populate the web portal with the first set of criteria related to the first document destination for the first digital document and the first set of structured information.

7. The system of claim 6, wherein the one or more client devices includes an email-enabled scanner.

8. The system of claim 6, wherein the first document destination is a mail and print service.

9. The system of claim 6, wherein the one or more client devices are further configured to display, in the web portal, a plurality of criteria related to the first document destination.

10. The system of claim 6, wherein the one or more client devices includes an internet enabled computing device.

11. The system of claim 6, wherein the first set of structured information and the first digital document are displayed simultaneously.

12. The system of claim 6, wherein the first digital document is an invoice.

13. A method of managing digital documents, the method comprising:
   digitizing, using a client device, a first document and a second document to generate a first set of digital documents, the first set of digital documents including a first digital document and a second digital document, the first set of digital documents generated from a single digitizing process;
   transmitting, over a wide area network, the first set of digital documents to a host device;
   separating the first digital document and the second digital document;
   routing the first digital document and the second digital document to a client pending queue associated with a first client account;
   extracting a first set of structured information from the first digital document;
   storing the first set of structured information in a first relational database;
   storing the first digital document in a first directory;
   displaying the first digital document and the first set of structured information in a web portal,
   wherein the first set of structured information is displayed in an editable interface of the web portal;
   receiving, through the web portal, a first set of criteria related to a first document destination;
   transmitting the first digital document and the first set of structured information to the first document destination;
   extracting a second set of structured information from the second digital document;
   storing the second set of structured information in the first relational database;
   storing the second digital document in the first directory;
   receiving, through the web portal, a second set of criteria related to a second document destination; and
   transmitting the second digital document and the second set of structured information to the second document destination.

14. The method of claim 13, wherein the first document destination is a mail and print service.

15. The method of claim 13, further comprising encrypting the first digital document.

16. The method of claim 13, further comprising generating a document template related to the first digital document.

* * * * *